United States Patent
Zha et al.

(12) 
(10) Patent No.: US 6,818,721 B2
(45) Date of Patent: Nov. 16, 2004

(54) PROCESS FOR PRODUCING POLYSILOXANES AND USE OF THE SAME

(75) Inventors: Congji Zha, Eveleigh (AU); Dax Kukulj, Eveleigh (AU)

(73) Assignee: RPO Pty Ltd., Eveleigh (AU)

( * ) Notice: Subject to any disclaimer, the term of this patent is extended or adjusted under 35 U.S.C. 154(b) by 0 days.

(21) Appl. No.: 10/308,562

(22) Filed: Dec. 2, 2002

(65) Prior Publication Data

US 2004/0106761 A1 Jun. 3, 2004

(51) Int. Cl.⁷ .............................. C08G 77/08
(52) U.S. Cl. ........................ 528/12; 528/20; 528/32; 528/41; 528/42
(58) Field of Search ............... 528/12, 20, 32, 528/41, 42

(56) References Cited

U.S. PATENT DOCUMENTS

| | | | |
|---|---|---|---|
| 3,668,228 A | 6/1972 | Zbinden et al. | |
| 4,007,153 A | 2/1977 | Smith | |
| 4,301,056 A | 11/1981 | Patzke et al. | |
| 5,109,093 A | 4/1992 | Rees et al. | 528/14 |
| 5,109,094 A | 4/1992 | Rees et al. | 528/14 |

FOREIGN PATENT DOCUMENTS

| | | |
|---|---|---|
| EP | 0 081 119 | 6/1983 |
| EP | 0 382 366 | 8/1990 |
| EP | 0 503 825 | 9/1992 |
| GB | 918823 | 2/1963 |
| GB | 2 309 460 | 7/1997 |
| JP | 55-133453 | 10/1980 |
| JP | 58-167648 | 10/1983 |
| JP | 63-043954 | 2/1988 |
| JP | 01-152532 | 1/1991 |
| JP | 01-339091 | 8/1991 |
| JP | 04-225064 | 8/1992 |
| JP | 05-039422 | 2/1993 |
| JP | 06-157910 | 6/1994 |
| JP | 06-306292 | 11/1994 |
| JP | 08-048850 | 2/1996 |
| JP | 09-227780 | 9/1997 |
| JP | 10-030058 | 2/1998 |
| JP | 10-316858 | 12/1998 |
| JP | 11-080550 | 3/1999 |
| JP | 11-116586 | 4/1999 |
| JP | 11-209620 | 8/1999 |
| JP | 11-335379 | 12/1999 |
| JP | 2001-181508 | 7/2001 |
| WO | WO 01/04156 A1 | 1/2001 |
| WO | WO 01/04186 | 1/2001 |

OTHER PUBLICATIONS

U.S. patent application Ser. No. 10/151,710.*
U.S. patent application Ser. No. 10/167,068.*

* cited by examiner

Primary Examiner—Kuo-Liang Peng
(74) Attorney, Agent, or Firm—Morrison & Foerster LLP

(57) ABSTRACT

A process for the preparation of an organosilicon condensate which comprises reacting together (A) at least one silicon containing compound having at least one silanol group; and (B) at least one silicon containing compound having at least one —OR group in the presence of (C) a calcium or magnesium catalyst selected to allow the reaction to proceed and (D) at least one solvent. Advantageous catalysts include calcium hydroxide, calcium oxide, magnesium hydroxide or magnesium oxide. Advantageously the solvent may be a protic solvent such as water, methanol, ethanol, 1-propanol, 2-propanol, 1-butanol and 2-butanol. The invention also relates to condensates, such as siloxanes, prepared by the process.

53 Claims, 1 Drawing Sheet

PROCESS FOR PRODUCING POLYSILOXANES AND USE OF THE SAME

FIELD OF THE INVENTION

The present invention relates to processes for the production of polysiloxanes, and in particular to processes which yield siloxanes through the condensation of a silanol (SiOH) with an alkoxy compound (SiOR).

BACKGROUND

Polysiloxanes (alternating Si—O backboned polymers) have found use in a variety of fields. However, their good light transmission properties, substrate adhesion and mechanical and chemical stability over an extended temperature range make them attractive targets for use in optical materials such as optical waveguides and devices. Of particular interest is the fact that the mechanical, optical and chemical properties of polysiloxanes can be controlled and modified by variation of the starting monomer compositions and by control of reaction conditions.

One method commonly employed for the preparation of siloxanes involves the hydrolysis of silicon alkoxides in organic solution with stoichiometric amounts of water in the presence of catalytic quantities of acid. Such reaction conditions often result in significant residual quantities of OH groups (either from water or Si—OH or both) in the reaction mixture which are often difficult to remove. This is especially problematical in the field of polymer optics, where a low OH content is highly desirable in any polymeric light transmissive material. OH groups have a high near-IR absorption (3500 cm$^{-1}$) that impacts negatively upon optical transparency at 1550 nm. Uncondensed Si—OH groups can also continue a slow reaction over the service life of the polymeric material, which can lead to cracking and loss of adhesion.

One alternative route to polysiloxanes of controlled functionality is via the condensation of a silanol bearing molecule, SiOH, with an alkoxy silanol, SiOR. This route is an attractive one, compared to the condensation of two silanols, because it is an asymmetric condensation. Asymmetric condensations can often be advantageous—for example by the "head to tail" condensation of a single compound bearing both silanol and alkoxysilane groups, or the alternating condensation of diols and dialkoxy compounds. Both these approaches allow a degree of regularity to be imparted into a polysiloxane by the use of a simple choice of starting monomers. It also allows ready introduction of a variety of functionalities into condensates.

A further advantage of the condensation of silanols with alkoxy silanes is the preparation of branched or linear highly functionalised compounds. One system of particular interest is the preparation of polycondensates as disclosed in PCT Publication No. WO/0104186. In particular, these condensations are between an organically modified silane diol (the silanol) and an organically modified silane (the alkoxy silane) and which may be represented by the following scheme:

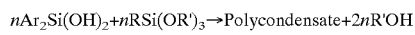

$n\text{Ar}_2\text{Si(OH)}_2 + n\text{RSi(OR')}_3 \rightarrow \text{Polycondensate} + 2n\text{R'OH}$ Theoretically, each silicon is capable of being either di-branched (from the silanol) or tri-branched (from the alkoxy silane), although in reality, steric influences mean that most silicon atoms are di-branched and so a number of Si—OR' groups may be found in the polycondensate. This reaction is of particular interest because of the physical properties of the condensates generally and because it allows functionality to be introduced into the polycondensate by either substitution on the Ar group, or substitution on the R group. Functionality can include such things as cross-linkability etc, as disclosed in U.S. patent application Ser. Nos. 10/151,710 and 10/167,068, the disclosures of which are incorporated herein by reference.

However, one weakness of the approach has been the nature of the catalyst required to carry out the condensation and form the cross-linked polysiloxane backbone of the polycondensate. A variety of catalysts have been employed for condensation reactions including, for example, sulphuric acid, hydrochloric acid, Lewis acids, sodium or potassium hydroxide and tetramethylammonium hydroxide. These catalysts can be chemically severe and when involved in the condensation of silanols with alkoxy silanes have been found to cause bond scission and random rearrangement. This problem was addressed, for example, in GB 918,823 which provided condensation catalysts for the production of organosilicon compounds without siloxane bond scission and rearrangement.

The solution provided by GB 918,823 is, however, not entirely satisfactory from the point of view of polymer optical materials. GB 918,823 discloses the use of amine salts of phosphoric or carboxylic acids as condensation catalysts. While these may promote condensation without rearrangement, they are inherently unsuitable for use in the production of optical materials because they are usually liquids and/or are not readily removable from the product. The use of these compounds as catalysts for polymers in optical applications is also further hindered because they degrade at high temperatures, so any residual catalyst remaining within the polymer matrix would degrade during possible subsequent heat treatment.

The production of optical materials based on organosilicon compounds requires that the chemical structure of the components be well known and controlled. In order to achieve high optical performance, the structures need good reproducibility and predictability. Further, fine-tuning the physical properties by chemical modification requires very precise control of the chemical structure and also precise control over other components which may remain in the material as artefacts of production. From this point of view, not only must random rearrangements within the polymer be kept to a minimum, but also large residual amounts of catalyst or catalyst degradation product are clearly unacceptable.

U.S. Pat. No. 5,109,094 discloses the synthesis of siloxanes from the condensation of silanols (or via the self condensation of a disilanol) via the use of magnesium, calcium, strontium and barium hydroxides, however, as mentioned above, in the present circumstances the silanol-silanol condensation is not such an interesting reaction as the condensation of silanols with alkoxy silanes. U.S. Pat. No. 5,109,093 by the same inventors, discloses the synthesis of siloxanes from a condensation of silanol and alkoxysilane, but stipulates that the reaction proceeds only in the presence of a barium or strontium catalyst. This narrower range of catalysts suggests that the reaction of alkoxy silanes with silanediols is more catalyst sensitive than the reaction of two silanediols.

A specific drawback with the use of barium or strontium hydroxide catalysts is their relative toxicity. Barium hydroxide, for example, has an oral LD50 in rats of 308 mg/kg, whereas the LD50 for calcium hydroxide is 7300 mg/kg, ie barium hydroxide is around 20 times more toxic than the corresponding calcium salt. Even in circumstances where barium exposure to humans is not likely to be an actual problem, it could well be perceived by the market place as such. Further, close consideration also needs to be given to the disposal options for the strontium or barium compounds removed from the siloxane after preparation.

According to a first aspect, the invention provides a process for the preparation of an organosilicon condensate which comprises reacting together:

(A) at least one silicon containing compound having at least one silanol group; and (B) at least one silicon containing compound having at least one —OR group wherein R represents an alkyl group having from 1 to 8 carbon atoms, or an alkoxyalkyl group having from 2 to 8 carbon atoms in the presence of (C) a calcium or magnesium catalyst selected to allow the reaction to proceed and (D) at least one solvent.

The organosilicon condensate is a siloxane, and most preferably a polysiloxane.

Compounds (A) and (B) may independently be monomeric, dimeric, oligomeric or polymeric compounds.

The at least one silicon containing compound (A) is advantageously a silanol having between one and three unsubstituted or substituted hydrocarbon groups having from 1 to 18 carbon atoms, or alternatively may be described as a silanol with between one and four OH groups. A silanol with four OH groups is, in its simplest form silicic acid. Preferably, the silanol is diphenyl silanediol.

The silanol may also bear a crosslinkable group, for example, a double bond of the acrylate, methacrylate or styrene type. Another suitable crosslinkable group is an epoxide group.

In one preferred embodiment, the at least one silicon containing compound having at least one —OR group (B) is a monomeric compound with the general formula

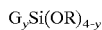

wherein y has a value of 0, 1, 2 or 3,

G represents a unsubstituted or substituted hydrocarbon group having from 1 to 18 carbon atoms; and R represents an alkyl group having from 1 to 8 carbon atoms or an alkoxyalkyl group having from 2 to 8 carbon atoms.

Preferably, the at least one silicon containing compound (B) is an alkoxysilane, which has from one to four alkoxy groups inclusive. Preferably, the alkoxy group (OR) is selected from the group consisting of methoxy, ethoxy, n-propoxy, i-propoxy, n-butoxy, i-butoxy, t-butoxy.

Like the silanol, the alkoxy silane may also bear a crosslinkable group, for example, a double bond of the acrylate, methacrylate or styrene type. Another suitable crosslinkable group is an epoxide group. Preferably, the crosslinkable group is on G, but it may be on OR.

Particularly preferred alkoxy silanes include 3-methacryloxypropyltrimethoxysilane, 3,3,3-trifluoropropyltrimethoxysilane, 1H, 1H, 2H, 2H-perfluorooctyltrimethoxysilane, octyltrimethoxysilane, 3-styrylpropyltrimethoxysilane and 3-glycidoxypropyltrimethoxysilane.

Alternatively, the at least one silicon containing compound having at least one —OR group (B) may be an oligomeric or polymeric compound of general formula

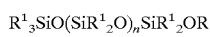

wherein R is as defined above, n is an integer $\geq 0$, and each $R^1$ may independently be G (as defined above), an alkoxy group having from 1 to 8 carbon atoms, an alkoxyalkyl group having from 2 to 8 carbon atoms, or an unsubstituted or substituted hydrocarbon group having from 1 to 18 carbon atoms.

Preferably, the calcium or magnesium catalyst is calcium hydroxide, calcium oxide, magnesium hydroxide or magnesium oxide. Preferably, calcium carbonate, calcium phosphate or magnesium carbonate are not chosen as catalysts. Preferably, a calcium catalyst is used.

Preferably at least one of the solvents is a protic solvent for example an alcohol such as methanol, ethanol, 1-propanol, 2-propanol, 1-butanol and 2-butanol. Alternatively, the protic solvent may be water.

The term solvent as used herein encompasses single component systems and multiple component systems, for example a mixture of a protic and non-protic solvent in any varying amount.

In another aspect, the invention provides a process for the preparation of an organosilicon condensation product which comprises condensing at least one silicon containing compound having (a) at least one silanol group; and (b) at least one —OR group wherein R represents an alkyl group having from 1 to 8 carbon atoms, or an alkoxyalkyl group having from 2 to 8 carbon atoms in the presence of (c) a calcium or magnesium catalyst selected to allow the reaction to proceed; and (d) at least one solvent.

Those skilled in the art will recognise this as an intramolecular version of the present inventive reaction. Those skilled in the art will recognise that any combination of inter and intramolecular condensations are contemplated by the present invention. It is also contemplated that combinations of crosslinkable and non-crosslinkable monomers or oligomers may be used, as well as non-identical monomers. Other reactions may also take place in the condensations of the present invention.

For example, the present invention provides a process wherein the silicon containing compound comprises both (i) a silanol-terminated polydiorganosiloxane and (ii) a polydiorganosiloxane terminated with a silanol group at one end and a triorganosiloxy group at the other.

Preferably, the calcium or magnesium catalyst and the solvents are separated from the organosilicon condensate.

The catalyst may be employed in an amount of from 0.0005 to 5% by mole based on the total silicon containing compounds, and more preferably in an amount of from 0.01 to 0.5% by mole based on the total silicon containing compounds.

The solvent or solvents may preferably be employed in an amount of from 0.02% to 200% by mole based on the total silicon containing compounds. More preferably they are employed in an amount of 0.2% to 100% by mole based on the total silicon compounds and even more preferably in an amount of 0.4 to 50% by mole based on the total silicon containing compounds.

In certain preferred embodiments, particularly where water is used as a solvent, it is preferably employed in amounts less than 8% by mole based on the total silicon-containing compounds, and more preferably less than 4% by mole based on the total silicon containing compounds.

Alternatively the amount of solvent or solvents required can be calculated, and as close to a stoichiometric amount as possible may be added.

The process of the present invention may be carried out at a temperature in the range from 40° C. to 150° C., more preferably from 50° C. to 100° C., and most preferably at about 80° C.

The polysiloxanes prepared by the method of the present invention preferably have absorption of less than 15 cm$^{-1}$ at about 2820 nm, and more preferably less than 7 cm$^{-1}$ at about 2820 nm.

It has been found by the present applicant that the condensation between a silanol and an alkoxy silane to produce a siloxane can be carried out by means of a basic calcium or magnesium catalyst, such as calcium hydroxide, calcium oxide, magnesium hydroxide or magnesium oxide in the presence of one or more solvents, at least one of which is advantageously a protic solvent, for example, water or an alcohol such as methanol, ethanol or 2-propanol.

Preferably, the calcium or magnesium catalyst is not calcium carbonate, calcium phosphate or magnesium carbonate.

As mentioned above, U.S. Pat. No. 5,109,093 discloses the synthesis of siloxanes from the condensation of a silanol and an alkoxysilane in the presence of a barium or strontium catalyst. U.S. Pat. No. 5,109,094 on the other hand discloses the synthesis of siloxanes from the condensation of silanols (or via the self condensation of a silanediol) via the use of magnesium, calcium, strontium and barium hydroxides. While this is a distinctly different reaction, it nevertheless suggests that the reaction of alkoxy silanes is more sensitive to the nature of the catalyst than the condensation of silanediols.

Thus, in combination, the teachings of U.S. Pat. No. 5,109,093 and U.S. Pat. No. 5,109,094 appear to suggest that attempts to condense a silanol and an alkoxy silane in the presence of a calcium or magnesium catalyst would at best lead to condensation of the silanol without reaction of the alkoxy silanes.

This conclusion is consistent with the conventional use of calcium compounds, especially calcium carbonate, which is used as a filler for polysiloxane polymers. It is important to distinguish the present condensation catalysts from the use of calcium carbonate, which due to its cheapness and inertness is often added as a filler, to reduce the overall cost of the product. In the field of polymer optics, solid particulate matter dispersed throughout a polymer would render it useless as a result of scattering and occlusion.

Surprisingly, however, it was also found that not only did these reaction conditions enable condensation with a non-toxic catalyst, but it was also found that the siloxane polymer produced via a calcium hydroxide catalyst is distinct from a siloxane polymer produced with a barium catalyst as disclosed in U.S. Pat. No. 5,109,093.

In particular, siloxane polymers produced via the calcium-catalysed reaction of the present invention have a lower OH content than those produced via barium hydroxide catalysis under otherwise identical conditions. A low OH content is of particular importance in the application of optical devices because minimising the free OH content is essential for minimising absorption in the 1550 nm region.

As mentioned above, while the reaction of the present invention has general applicability to the condensation of silanols with alkoxysilanes, a reaction of specific interest is the polycondensation of silanediols with trialkoxysilanes or dialkoxysilanes, especially where either of the components bears functionality for further cross-linking.

The present invention allows for the polycondensation of the type disclosed in PCT Publication No. WO/0104186 to be carried out with avoidance of toxic catalysts.

This polycondensation produces storage stable, UV curable, NIR transparent, polycondensates by condensation of one or more silanediols of formula (I) and/or derived precondensates thereof

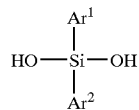

(I)

With one or more silanes of formula (II) and/or derived precondensates thereof

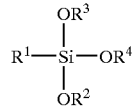

(II)

Alternatively, in place of compounds of formula (II), compounds such as $R^1R^2Si(OR^3)(OR^4)$ may be employed.

$Ar^1$ and $Ar^2$ may for example independently be a group with up to 20 carbon atoms and at least one aromatic or heteroaromatic group and $R^1$, $R^2$, $R^3$ and $R^4$ are independently alkyl, aralkyl or aryl or the like. Any of these groups may bear cross-linkable functional groups and may be substituted in whole or in part, for example with halogen atoms.

The cross-linking functionalities may be for example double bonds, such as in a styrene or acrylate (where they are more reactive by conjugation), or epoxides.

Those skilled in the art will appreciate that substitution of a hydrogen on any of the components by fluorine may take place in order to enhance the optical properties of the polycondensate and subsequently cured matrix. Fluorination decreases the refractive index and reduces the attenuation of the polycondensate at wavelengths in the near IR that are useful for optical communications.

Other reactive species, such as —OH, —SH and —NH$_2$ may also be present on one or more of the substituents, to facilitate additional chemistry of the matrix, polycondensate, and oligomeric or monomeric species as desired.

Combinations of non-crosslinkable and crosslinkable building blocks may also be used.

Similarly, some or all of the components may be replaced with co-condensable equivalents. For example, some or all of the compounds mentioned above may be replaced by one or more co-condensable compounds of boron or aluminum of general formula (III). These substitutions may have the advantage of increasing chemical stability and mechanical hardness.

(III)

The groups R" are identical or different, M signifies boron or aluminum and R" represents an alkyl group with 1 to 4 carbon atoms. In the general formula (III), all three alkoxy groups can condense with compounds of general formula (I), so that only ⅔ of the molar quantity is required. The replacement compounds can be quite highly branched before cross-linking. Examples of compounds of general formula (III) are Al(OCH$_3$)$_3$, Al(OC$_2$H$_5$)$_3$, Al(O-n-C$_3$H$_7$)$_3$, Al(O-i-C$_3$H$_7$)$_3$, Al(O-n-C$_4$H$_9$)$_3$, Al(O-i-C$_4$H$_9$)$_3$, Al(O-s-C$_4$H$_9$)$_3$, B(O-n-C$_4$H$_9$)$_3$, B(O-t-C$_4$H$_9$)$_3$, B(O-n-C$_3$H$_7$)$_3$, B(O-i-C$_3$H$_7$)$_3$, B(OCH$_3$)$_3$ and B(OC$_2$H$_5$)$_3$.

Alternatively, some or all of $R^1Si(OR)_3$ or $R^1{}_2Si(OR)_2$ as the case may be can be replaced by one or more co-condensable compounds of silicon, germanium, titanium or zirconium of general formula (IV).

$$M'(OR'')_4 \quad \quad (IV)$$

The groups R" are identical or different, M' signifies silicon, germanium, titanium or zirconium and R" represents an alkyl group with 1 to 4 carbon atoms. In the general formula (IV), all four alkoxy groups can condense with compounds of general formula (I), so two molecules of compound (II) may be replaced by one molecule of compound (IV). Examples of compounds of general formula (IV) include $Si(OCH_3)_4$, $Si(OC_2H_5)_4$, $Si(O-n-C_3H_7)_4$, $Si(O-i-C_3H_7)_4$, $Si(O-n-C_4H_9)_4$, $Si(O-i-C_4H_9)_4$, $Si(O-s-C_4H_9)_4$, $Ge(OCH_3)_4$, $Ge(OC_2H_5)_4$, $Ge(O-n-C_3H_7)_4$, $Ge(O-i-C_3H_7)_4$, $Ge(O-n-C_4H_9)_4$, $Ge(O-i-C_4H_9)_4$, $Ge(O-s-C_4H_9)_4$, $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, $Ti(O-i-C_4H_9)_4$, $Ti(O-s-C_4H_9)_4$, $Zr(OCH_3)_4$, $Zr(OC_2H_5)_4$, $Zr(O-n-C_3H_7)_4$, $Zr(O-i-C_3H_7)_4$, $Zr(O-n-C_4H_9)_4$, $Zr(O-i-C_4H_9)_4$ and $Zr(O-s-C_4H_9)_4$.

By substituting the compounds of general formula (II) by compounds of general formula (III) or (IV), the refractive index and optical attenuation of the resultant polycondensate can be tuned to a specific application. For example at certain wavelengths, alkyl-substituted components cause a reduction in refractive index while simultaneously increasing the attenuation while aryl-substituted components cause an increase in refractive index without significantly increasing attenuation.

Other resins, oligomers, monomers, particulate matter or other functional material may be added to the reaction mixture to modify the physical (refractive index), mechanical (hardness, thermal expansion profile) or chemical (introduction of reactive moieties) properties of the resulting polycondensate. Product polycondensates may also be blended together to obtain desired optical properties.

The polycondensates prepared by calcium or magnesium catalysed reactions of the present invention are highly transparent in the critical NIR wavelengths of 1310 nm and 1550 nm. Further, they can be made UV curable and photo-structurable in layers of thickness up to 150 μm without loss of quality, making them suitable for application as photoresists, negative resists, dielectrics, light guides, transparent materials, or as photo-structurable materials.

It is also possible to add further polymerisable components (monomers, oligomers or polymers) before curing, for example acrylates, methacrylates or styrene compounds (to space polymer chains), where the polymerisation proceeds across the C=C double bonds, or compounds containing ring systems that are polymerisable by cationic ring opening.

Photoinitiators or thermal initiators may be added to increase the rate of curing. Commercially available photoinitiators include 1-hydroxycyclohexylphenyl ketone, benzophenone, 2-chlorothioxanthone, 2-methylthioxanthone, 2-iso-propylthioxanthone, benzoin, 4,4'-dimethoxybenzoin etc. For curing with visible light, the initiator may be for example camphorquinone.

For thermal initiators, organic peroxides in the form of peroxides (e.g. dibenzoyl peroxide), peroxydicarbonates, peresters (t-butyl perbenzoate), perketals, hydroperoxides may also be used. AIBN (azobisisobutyronitrile) may also be used. Radiation cure, for example by gamma rays or electron beam, is also possible.

Other additives, such as stabilisers, plasticisers, contrast enhancers, dyes or fillers may be added to enhance the properties of the polycondensate as required.

For example, stabilisers to prevent or reduce degradation, which leads to property deterioration such as cracking, delamination or yellowing during storage or operation at elevated temperature, are advantageous additives.

Such stabilisers include, but are not limited to, UV absorbers, light stabilisers, and antioxidants. UV absorbers include hydroxyphenyl benzotriazoles, such as 2-[2-hydroxy-3,5-di(1,1-dimethylbenzyl)phenyl]-2-H-benzotriazole (Tinuvin 900), poly(oxy-1,2-ethanediyl), α-(3-(3-(2H-benzyotriazol-2-yl)-5-(1,1-dimethylethyl)-4-hydroxyphenyl)-1-oxopropyl)-ω-hydroxy (Tinuvin 1130), and 2-[2-hydroxy-3,5-di(1,1-dimethylpropyl)phenyl]-2-H-benzotriazole (Tinuvin 238), and hydroxybenzophenones, such as 4-methoxy-2-hydroxybenzophenone and 4-n-octoxy-2-hydrox benzophenone. Light stabilisers include hindered amines such as 4-hydroxy-2,2,6,6-tetramethylpiperidine, 4-hydroxy-1,2,2,6,6-pentamethylpiperidine, 4-benzoyloxy-2,2,6,6-tetramethylpiperidine, bis(2,2,6,6-tetramethyl-4-piperidinyl)sebacate (Tinuvin 770), bis(1,2,2,6,6-pentamethyl-4-piperidinyl)sebacate (Tinuvin 292), bis(1,2,2,6,6-pentamethyl-4-piperidinyl)-2-n-butyl-2-(3,5-di-tert-butyl-4-hydroxybenzyl)malonate (Tinuvin 144), and a polyester of succinic acid with N-β-hydroxy-ethyl-2,2,6,6-tetramethyl-4-hydroxy-piperidine (Tinuvin 622). Antioxidants include substituted phenols such as 1,3,5-trimethyl-2,4,6-tris(3,5-di-tert-butyl)-4-hydroxybenzyl)benzene, 1,1,3-tris-(2-methyl-4-hydroxy-5-tert-butyl)phenyl)butane, 4,4'-butylidene-bis-(6-tert-butyl-3-methyl)phenol, 4,4'-thiobis-(6-tert-butyl-3-methyl)phenol, tris-(3,5-di-tert-butyl-4-hydroxybenzyl)isocyanurate, cetyl-3,5-di-tert-butyl-4-hydroxybenzene (Cyasorb UV2908), 3,5-di-tert-butyl-4-hydroxybenzoic acid, 1,3,5-tris-(tert-butyl-3-hydroxy-2,6-dimethylbenzyl) (Cyasorb 1790), stearyl-3-(3,5-di-tert-butyl-4-hydroxyphenyl)proprionate (Irganox 1076), pentaerythritol tetrabis(3,5-di-tert-butyl-4-hydroxyphenyl) (Irganox 1010), and thiodiethylene-bis-(3,5-di-tert-butyl-4-hydroxy)hydrocinnamate (Irganox 1035).

EXAMPLES

Figure 1:
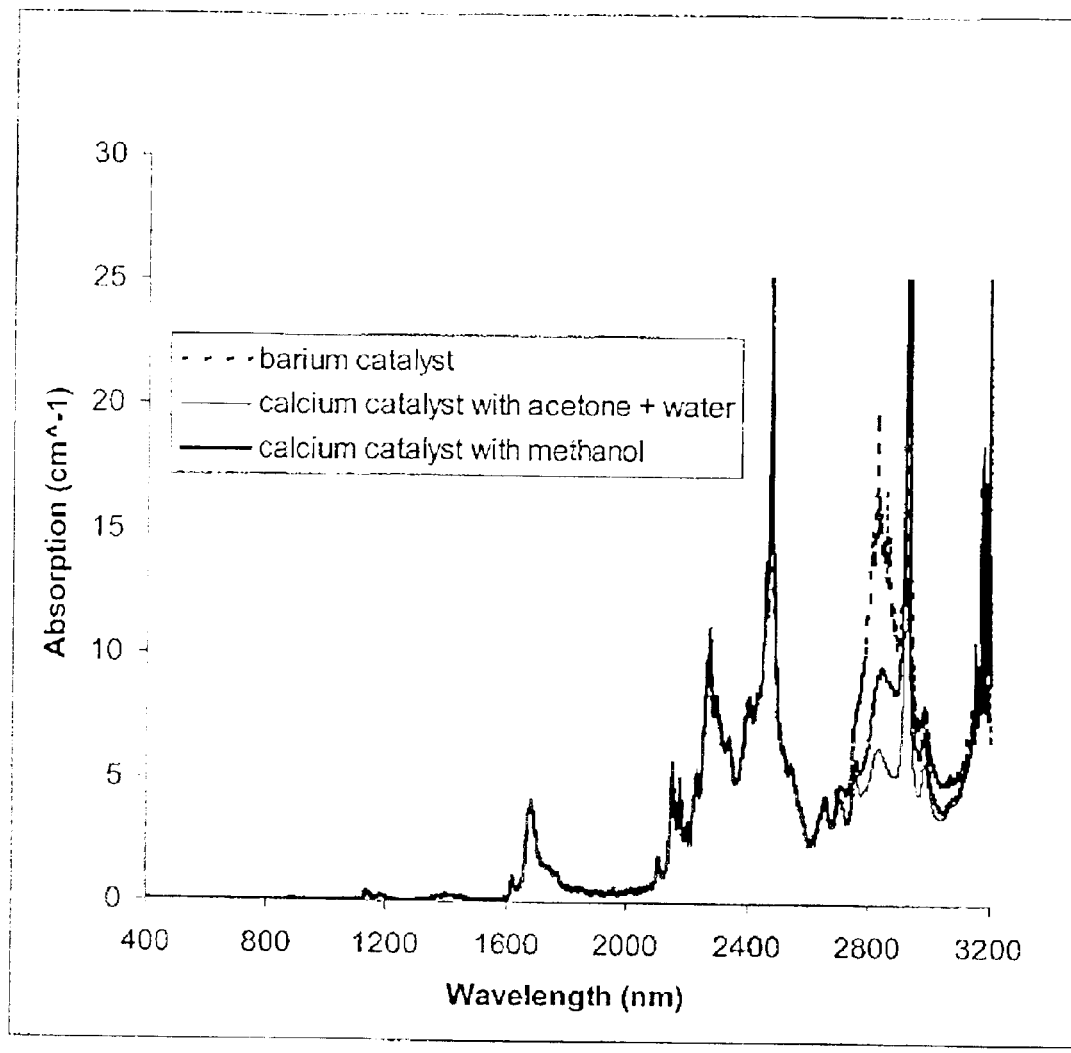
FIG. 1 shows visible-IR spectra for barium and calcium catalysed polycondensate resins.

A number of examples are shown in Table 1. All the examples in the table relate to the condensation of a polymeric material formed from a 1:1 mixture of diphenyl silanediol (V) and 3-methacryloxypropyltrimethoxysilane (VI).

The invention is demonstrated by the following non-limiting examples:

The condensation of the present invention was investigated firstly for a single condensation, between diphenyl silanediol (molecular mass 216.3) and 3-methacryloxypropyltrimethoxysilane (molecular mass 248.4). This condensation produces a polycondensate which is crosslinkable by activation of the methacrylate functionality.

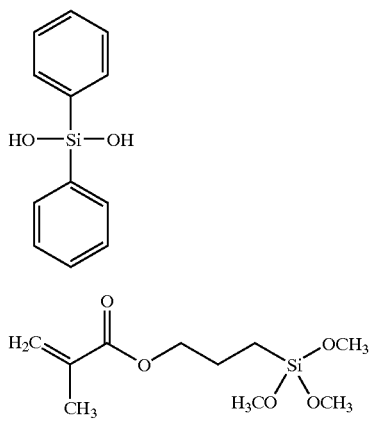

Examples 1–13

General Procedure:

Diphenyl silanediol (ABCR) and 3-methacryloxypropyltrimethoxysilane (Gelest) were mixed and heated to 80° C. for 30 min. Catalyst and solvent were added and the mixture maintained at 80° C. for 1 hr. The solvents were removed by distillation. The resin was then filtered through a 0.2 μm filter to remove the insoluble catalyst. The refractive index was measured on an Abbe refractometer and the viscosity was measured on a Brookfield DV-II+ RV with small sample adaptor.

The product viscosity appears to be influenced by both the amount of catalyst employed, and by the amount of solvent used.

The more catalyst present, the higher the viscosity achieved. Once condensation reaches a certain point, accessibility to reactive sites becomes important so the condensation reaction becomes more dependent upon catalyst concentration. Larger amounts of catalyst are able to condense more SiOH and SiOR groups in the starting material, leading to a higher molecular weight and a higher viscosity.

The solvent appeared to have an optimal quantity for aiding catalysis. In Examples 3, 6 and 7, which all have 0.20 mol % catalyst, the reaction in the case of the 38.8 mol % solvent gave a viscosity of 2910 cP, whereas for the lower amount of solvent, the viscosity was 2270 cP and for the higher concentration, the viscosity was 2370 cP. This suggests a competing effect of reagent concentration and dilutions, ie beyond the optimal concentration, the methanol begins to dilute the mixture, slowing the rate of reaction.

Example 8 shows the reaction using calcium hydroxide catalyst and water as the solvent. This is in direct contrast to the reactions of PCT Publication No. WO/0104186 which specifically exclude water from the condensation.

Examples 9 to 11 show the reactions proceeding in different solvents. Interestingly, the reaction proceeded more quickly in dry methanol than in undried methanol.

Example 12 shows the reaction proceeds with CaO in the presence of methanol, however, when methanol is absent, as in Example 13a, condensation does not take place.

A number of counter examples of failed reactions e.g. those with calcium carbonate or calcium phosphate as

TABLE 1

| | DPS (g) | MPS (g) | Catalyst | Cat Level | Solvent | Solvent level (%) | RI | Viscosity (cP) |
|---|---|---|---|---|---|---|---|---|
| 1 | 33.920 | 38.940 | Ca(OH)$_2$ | 0.10 | — | — | No reaction | |
| 2 | 67.861 | 77.994 | Ca(OH)$_2$ | 0.10 | methanol | 38.8 | 1.5355 | 2180 |
| 3 | 60.546 | 69.539 | Ca(OH)$_2$ | 0.20 | methanol | 38.8 | 1.5365 | 2910 |
| 4 | 60.160 | 69.123 | Ca(OH)$_2$ | 0.33 | methanol | 38.8 | 1.5395 | 5780 |
| 5 | 32.542 | 37.363 | Ca(OH)$_2$ | 0.50 | methanol | 15.5 | 1.5390 | 5380 |
| 6 | 64.569 | 74.163 | Ca(OH)$_2$ | 0.20 | methanol | 20.2 | 1.5355 | 2270 |
| 7 | 56.569 | 64.958 | Ca(OH)$_2$ | 0.20 | methanol | 58.5 | 1.5366 | 2370 |
| 8 | 70.191 | 80.588 | Ca(OH)$_2$ | 0.10 | water (deionised) | 3.4 | 1.5350 | 1850 |
| 9 | 35.459 | 40.835 | Ca(OH)$_2$ | 0.20 | ethanol | 54.0 | 1.5310 | 1050 |
| 10 | 36.654 | 42.089 | Ca(OH)$_2$ | 0.20 | 2-propanol | 62.0 | 1.5335 | 1660 |
| 11 | 32.116 | 36.874 | Ca(OH)$_2$ | 0.20 | dry methanol | 38.8 | 1.5385 | 5160 |
| 12 | 35.538 | 40.796 | CaO | 0.10 | methanol | 38.8 | 1.5360 | 1560 |
| 13a | 32.700 | 37.546 | CaO | 0.50 | — | — | no reaction | |
| 13b | 33.221 | 38.140 | Ca$_5$(PO$_4$)$_3$OH | 0.2 | methanol | 38.8 | no reaction | |
| 13c | 28.968 | 33.271 | CaCO3 | 0.2 | methanol | 38.8 | no reaction | |
| 13d | 70.191 | 80.584 | Ca(OH)2 | 0.1 | acetone | 21.4 | no reaction | |
| 13e | 30.246 | 34.725 | Ca(OH)2 | 0.1 | CH$_2$Cl$_2$ | 127 | no reaction | |

DPS: diphenyl silanediol
MPS: 3-methacryloxypropyltrimethoxysilane
Cat level: mol % based on total silicon containing compounds
Solvent level: mol % based on total silicon containing compounds
Viscosity: measured in centipoise at 20.0° C.
RI: refractive index measured at 20.0° C. with visible light
dry methanol: dried over activated molecular sieves Example 1 shows that, in the absence of a solvent, in particular a protic solvent, the reaction does not proceed.

Examples 2 to 7 show that for a range of catalyst levels (from 0.1 mole % to 0.50 mole % with respect to the total silicon containing compounds) and solvent levels (from 15.5 mol % to 58.5 mol % with respect to the total silicon containing compounds), the reaction proceeded efficiently.

catalyst or solely with aprotic solvents such as acetone or dichloromethane are shown as examples 13b to 13e.

Example 13b illustrates that specific types of basic calcium catalyst are required. Similar considerations apply with Example 13c which is of further interest because, as mentioned previously, calcium carbonate is used as a filler in siloxanes, and may in some cases be added prior to any condensation step. The results obtained by the present inventors are in accordance with conclusions drawn from the prior art that calcium carbonate is inert in respect of the reaction between a silanol and an alkoxy silane.

Examples 13d and 13e show that condensation does not proceed in the presence of a hydrophilic aprotic solvent (acetone), or a hydrophobic aprotic solvent (dichloromethane) alone.

The following examples illustrate the formation of polymers from mixed silanediols and alkoxy silanes in accordance with the general scheme in PCT Publication No. WO/0104186.

Example 14

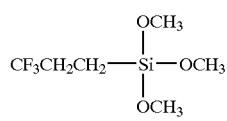
(VII)

64.590 g diphenyl silanediol (V) (ABCR), 37.085 g 3-methacryloxypropyltrimethoxysilane (VI) (Gelest) and 32.604 g of 3,3,3-trifluoropropyltrimethoxysilane (VII) (Gelest) were mixed and heated to 80° C. for 30 min. To this was added 0.20 mol % Ca(OH)$_2$ (based on the total silicon containing compounds) and 38.8 mol % methanol (based on the total silicon containing compounds) and the mixture maintained at 80° C. for 1 hr. The solvents were removed by distillation. The resin was then filtered through a 0.2 μm filter to remove the insoluble catalyst. At 20.0° C., RI=1.5226 and viscosity=3360 cP.

Example 15

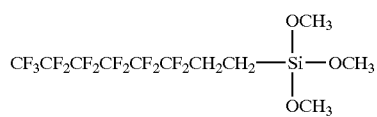
(VIII)

54.700 g diphenyl silanediol (V) (ABCR), 31.407 g 3-methacryloxypropyltrimethoxysilane (VI) (Gelest) and 59.210 g of 1H, 1H, 2H, 2H-perfluorooctyltrimethoxysilane (VIII) (Gelest) were mixed and heated to 80° C. for 30 min. To this was added 0.20 mol % Ca(OH)$_2$ (based on the total silicon containing compounds) and 40 mol % methanol (based on the total silicon containing compounds) and the mixture maintained at 80° C. for 1 hr. The solvents were removed by distillation. The resin was then filtered through a 0.2 μm filter to remove the insoluble catalyst. At 20.0° C., RI=1.4824 and viscosity=4020 cP.

Example 16

This example illustrates the use of a magnesium catalyst. 51.335 g diphenyl silanediol (V) (ABCR) and 58.952 g methacryloxypropyltrimethoxysilane (VI) (Gelest) were mixed and heated to 80° C. for 30 min. To this was added 0.50 mol % Mg(OH)$_2$ (based on the total silicon containing compounds) and 13.8 mol % deionised water (based on the total silicon containing compounds). After 2.5 h, 77.6 mol % methanol (based on the total silicon containing compounds) was added, and the mixture maintained at 80° C. for a further 15 min. The solvents were removed by distillation. The resin was then filtered through a 0.2 μm filter to remove the insoluble catalyst. At 20.0° C., RI=1.5202 and viscosity=155 cP.

Example 17

Three crosslinkable resins were prepared which were otherwise identical except for the catalyst used to facilitate the reaction. Two resins were prepared using a calcium hydroxide catalyst in accordance with the present invention and the other resin was prepared using a barium hydroxide catalyst. The level of residual OH in each resin was then assessed by measuring the absorption in the near infrared near 2820 nm (measured on a Shimadzu UV-3101PC UV/VIS/NIR spectrophotometer).

Reaction Catalysed by Ca(OH)$_2$ and Methanol:

315.03 g diphenyl silanediol (V) (ABCR) and 361.70 g 3-methacryloxypropyltrimethoxysilane (VI) (Gelest) were mixed and heated to 80° C. for 30 min. To this was added 0.20 mol % Ca(OH)$_2$ (based on the total silicon containing compounds) and 40 mol % methanol (based on the total silicon containing compounds) and the mixture maintained at 80° C. for 1 hr. The solvents were removed by distillation. The resin was then filtered through a 0.2 μm filter to remove the insoluble catalyst. At 20.0° C., RI=1.5356 and viscosity=2280 cP.

Absorbance at ~2820 nm=1.86 in a 2 mm Infrasil™ cuvette, implying absorption=9.3 cm$^{-1}$ or 93 dB/cm.

Reaction Catalysed by Ca(OH)$_2$ and Acetone Plus Water:

64.250 g diphenyl silanediol (V) (ABCR) and 73.760 g 3-methacryloxypropyltrimethoxysilane (VI) (Gelest) were mixed and heated to 80° C. for 30 min. To this was added 0.10 mol % Ca(OH)$_2$ (based on the total silicon containing compounds), 68.2 mol % acetone (based on the total silicon containing compounds) and 2.7 mol % deionised water (based on the total silicon containing compounds) and the mixture maintained at 80° C. for 3 hr. The solvents were removed by distillation. The resin was then filtered through a 0.2 μm filter to remove the insoluble catalyst. At 20.0° C., RI=1.5335 and viscosity=1780 cP.

Absorbance at ~2820 nm=1.26 in a 2 mm Infrasil™ cuvette, implying absorption=6.3 cm$^{-1}$ or 63 dB/cm.

This example also shows that the reaction can proceed with a mixture of solvents, so long as at least one is a protic solvent.

Reaction Catalysed by Ba(OH)$_2$:

344.78 g diphenyl silanediol(V) (ABCR) and 395.83 g 3-methacryloxypropyltrimethoxysilane(VI) (Gelest) were mixed and heated to 80° C. for 30 min. To this was added 0.10 mol % Ba(OH)$_2$ (based on the total silicon containing compounds) and the mixture maintained at 80° C. for 1 hr. The solvents were removed by distillation. The resin was then filtered through a 0.2 μm filter to remove the insoluble catalyst. At 20.0° C., RI=1.5385 and viscosity=5130 cP.

Absorbance at ~2820 nm=2.65 in a 2 mm Infrasil™ cuvette, implying absorption=13.25 cm$^{-1}$ or 133 dB/cm.

The absorption at about 2820 nm is a measure of the fundamental OH absorption. It is the first overtone of this absorption, peaking at around 1400 nm that impacts negatively on light transmission at 1550 nm. The absorptions at about 2820 nm of the two resins produced by a calcium catalyst were around 70% and 47% of that of a resin prepared by a barium catalyst.

FIG. 1 shows visible-IR spectra for the barium (dotted line) and the two calcium (thick and thin lines) catalysed polycondensate resins. The three spectra have been overlaid and it can be clearly seen that in the region below about 2700 nm, and above about 3100 nm, all three spectra largely coincide. However, in the region 2700–3100 nm, it can be seen that the polycondensate resin prepared with barium hydroxide catalysis has much higher absorption.

Example 18

This example illustrates UV curing and UV patterning applications of the inventive polycondensates, for producing integrated optical waveguides. To deposit a lower cladding layer, a polycondensate prepared according to Example 14 was diluted with cyclohexanone (4 wt %) containing 1 wt % of the photoinitiator Irgacure 1000. After vigorous mixing, the solution was filtered to 0.2 μm through a PTFE filter. A film was spin coated at 3000 rpm for 45 secs onto a silicon wafer, then flood exposed under a UV lamp. To form a core layer, a polycondensate prepared according to Example 8 was diluted with cyclohexanone (4 wt %) containing 1 wt % of the photoinitiator Irgacure 1000. After vigorous mixing, the solution was filtered to 0.2 μm through a PTFE filter, then a film was spin coated at 5000 rpm for 60 seconds. This layer was patterned via a UV proximity exposure in a mask aligner, with unexposed material then dissolved in propyl acetate to leave the desired waveguide core pattern. A top cladding layer was then deposited in the same manner as the lower cladding layer, and the process completed with a post bake at 170° C. for 3 hours under vacuum.

The invention has been described by reference to certain preferred embodiments; however, it should be understood that it may be embodied in other specific forms or variations thereof without departing from its spirit or essential characteristics. The embodiments described above are therefore considered to be illustrative in all respects and not restrictive, the scope of the invention being indicated by the appended claims rather than by the foregoing description.

What is claimed is:

1. A process for the preparation of an organo-silicon condensate which comprises reacting together:
   (A) at least one silicon containing compound having at least one silanol group; and
   (B) at least one silicon containing compound having at least one —OR group wherein R represents an alkyl group having from 1 to 8 carbon atoms, or an alkoxyalkyl group having from 2 to 8 carbon atoms in the presence of
   (C) a calcium or magnesium catalyst selected to allow the reaction to proceed wherein the calcium or magnesium catalyst is not calcium carbonate, calcium phosphate or magnesium carbonate; and
   (D) at least one protic solvent.

2. A process according to claim 1 wherein the at least one silicon containing compound having at least one silanol group and the at least one silicon containing compound having at least one —OR group are in a 1:1 molar ratio.

3. A process according to claim 1 wherein the organosilicon condensate is a siloxane.

4. A process according to claim 3 wherein the siloxane is a polysiloxane.

5. A process according to claim 1 wherein the at least one silicon containing compound having at least one silanol group is a silanol.

6. A process according to claim 5 wherein the silanol has between one and three unsubstituted or substituted hydrocarbon groups having from 1 to 18 carbon atoms.

7. A process according to claim 5 wherein the silanol has one OH group.

8. A process according to claim 5 wherein the silanol has two OH groups.

9. A process according to claim 5 wherein the silanol has three OH groups.

10. A process according to claim 5 wherein the silanol has four OH groups.

11. A process according to claim 5 wherein the silanol is diphenyl silanediol.

12. A process according to claim 5 wherein the silanol bears a crosslinkable group.

13. A process according to claim 12 wherein the crosslinkable group is a double bond.

14. A process according to claim 13 wherein the double bond is a carbon-carbon double bond.

15. A process according to claim 14 wherein the double bond is selected from an acrylate double bond, a methacrylate double bond and a styrene double bond.

16. A process according to claim 12 wherein the crosslinkable group is an epoxide.

17. A process according to claim 1 wherein the at least one silicon containing compound having at least one —OR group is a compound with the general formula

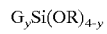

$$G_y Si(OR)_{4-y}$$

wherein y has a value of 0, 1, 2 or 3,
   G represents a unsubstituted or substituted hydrocarbon group having from 1 to 18 carbon atoms; and
   R represents an alkyl group having from 1 to 8 carbon atoms or an alkoxyalkyl group having from 2 to 8 carbon atoms.

18. A process according to claim 17 wherein the at least one silicon containing compound having at least one —OR group is an alkoxy silane.

19. A process according to claim 18 wherein the alkoxy silane has one alkoxy group.

20. A process according to claim 18 wherein the alkoxy silane has two alkoxy groups.

21. A process according to claim 18 wherein the alkoxy silane has three alkoxy groups.

22. A process according to claim 18 wherein the alkoxy silane has four alkoxy groups.

23. A process according to claim 17 wherein (OR) is selected from the group consisting of methoxy, ethoxy, n-propoxy, i-propoxy, n-butoxy, i-butoxy, t-butoxy.

24. A process according to claim 18 wherein the alkoxy silane bears a crosslinkable group.

25. A process according to claim 24 wherein the alkoxy silane bears a crosslinkable group on G.

26. A process according to claim 25 wherein the crosslinkable group is a double bond.

27. A process according to claim 26 wherein the double bond is a carbon-carbon double bond.

28. A process according to claim 26 wherein the crosslinkable group is a double bond selected from an acrylate double bond, a methacrylate double bond and a styrene double bond.

29. A process according to claim 25 wherein the crosslinkable group is an epoxide.

30. A process according to claim 17 wherein the alkoxy silane is a compound selected from the group consisting of 3-methacryloxypropyltrimethoxysilane, 3,3,3-trifluoropropyltrimethoxysilane, 1H, 1H, 2H, 2H-perfluorooctyltrimethoxysilane, octyltrimethoxysilane, 3-styrylpropyltrimethoxysilane, and 3-glycidoxypropyltrimethoxysilane, or mixtures thereof.

31. A process according to claim 1 wherein the calcium or magnesium catalyst is calcium hydroxide, calcium oxide, magnesium hydroxide or magnesium oxide.

32. A process according to claim 31 wherein the calcium or magnesium catalyst is calcium hydroxide.

33. A process according to claim 31 wherein the calcium or magnesium catalyst is calcium oxide.

34. A process according to claim 31 wherein the calcium or magnesium catalyst is magnesium hydroxide.

35. A process according to claim 31 wherein the calcium or magnesium catalyst is magnesium oxide.

36. A process according to claim 1 wherein the protic solvent is an alcohol.

37. A process according to claim 36 wherein the protic solvent is selected from the group consisting of methanol, ethanol, 1-propanol, 2-propanol, 1-butanol and 2-butanol.

38. A process according to claim 1 wherein the protic solvent is water.

39. A process for the preparation of an organosilicon condensation product which comprises condensing at least one silicon containing compound having
   (a) at least one silanol group; and
   (b) at least one —OR group
wherein R represents an alkyl group having from 1 to 8 carbon atoms, or an alkoxyalkyl group having from 2 to 8 carbon atoms in the presence of
   (c) a calcium or magnesium catalyst selected to allow the reaction to proceed wherein the calcium or magnesium catalyst is not calcium carbonate, calcium phosphate or magnesium carbonate; and
   (d) at least one protic solvent.

40. A process according to claim 39 wherein the at least one silicon containing compound comprises both (i) a silanol-terminated polydiorganosiloxane and (ii) a polydiorganosiloxane terminated with a silanol group at one end and a triorganosiloxy group at the other.

41. A process according to claim 1 wherein the calcium or magnesium catalyst is separated from the organosilicon condensate.

42. A process according to claim 1 wherein the catalyst is employed in an amount of from 0.0005 to 5% by mole based on the total silicon containing compounds.

43. A process as claimed in claim 42 wherein the catalyst is employed in an amount of from 0.01 to 0.5% by mole based on the total silicon containing compounds.

44. A process according to claim 1 wherein the protic solvent is employed in an amount of from 0.02% to 200% by mole based on the total silicon containing compounds.

45. A process according to claim 44 wherein the protic solvent is employed in an amount of from 0.2% to 100% by mole based on the total silicon containing compounds.

46. A process according to claim 45 wherein the protic solvent is employed in an amount of 0.4 to 50% by mole based on the total silicon containing compounds.

47. A process according to claim 46 wherein the protic solvent is water employed in an amount of less than 8% by mole based on the total silicon containing compounds.

48. A process according to claim 47 wherein the protic solvent is water employed in an amount of less than 4% by mole based on the total silicon containing compounds.

49. A process as claimed in claim 1 carried out at a temperature in the range from 40° C. to 150° C.

50. A process as claimed in claim 49 carried out at a temperature in the range from 50° C. to 100° C.

51. A process according to claim 50 carried out at about 80° C.

52. A polysiloxane prepared by the method of claim 1 having an absorption of near infrared radiation at about 2820 nm of less than 15 $cm^{-1}$.

53. A polysiloxane according to claim 52 having an absorption of near infrared radiation at about 2820 nm of less than 7 $cm^{-1}$.

* * * * *